UNITED STATES PATENT OFFICE.

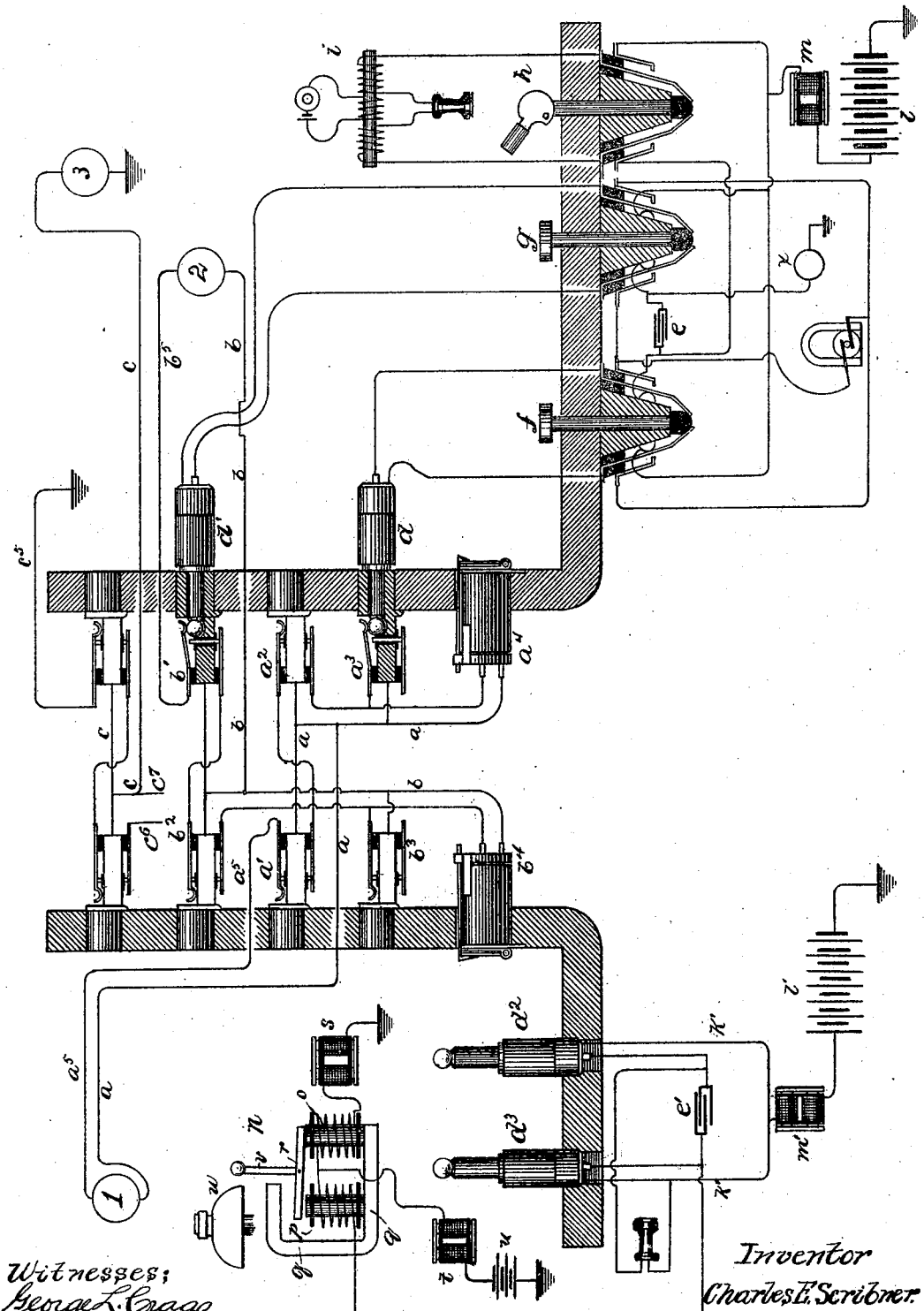

CHARLES E. SCRIBNER, OF CHICAGO, ILLINOIS, ASSIGNOR TO THE WESTERN ELECTRIC COMPANY, OF SAME PLACE.

TESTING SYSTEM FOR MULTIPLE SWITCHBOARDS.

SPECIFICATION forming part of Letters Patent No. 502,773, dated August 8, 1893.

Application filed June 29, 1891. Serial No. 397,902. (No model.)

*To all whom it may concern:*

Be it known that I, CHARLES E. SCRIBNER, a citizen of the United States, residing at Chicago, in the county of Cook and State of Illinois, have invented a certain new and useful Improvement in Testing Systems for Multiple Switchboards, (Case No. 272,) of which the following is a full, clear, concise, and exact description, reference being had to the accompanying drawing, forming a part of this specification.

My invention relates to testing systems for multiple switch boards of telephone exchanges; its object is to provide simple means whereby a test signal of certain origin may be produced.

It is well known that in multiple switch board systems signals are frequently given in response to a test by an operator, arising from static charges on the line, or from currents induced by heavy currents circulating in conductors in the neighborhood of the lines tested.

My invention is designed to annul the influence of such foreign currents.

My invention comprises, first, in circuit with the testing plug, a source of electricity of such strength as to overcome any current arising from accidental causes in the line, and a polarized responsive device which shall not give a response when a current from this battery traverses its coil; and second, in connection with the testings of a busy line, a battery of such strength as to operate the polarized responsive device. Thus when a test of a line is made, a response from the polarized device gives a certain indication that the line tested is already in use.

The polarized responsive device I construct as follows: Two magnets having cores permanently polarized in the same direction are adapted to act normally with equal force upon opposite extremities of a common centrally pivoted armature. One extremity of the coil of one magnet is connected directly to the testing plug; the other extremity of the coil is connected to one pole of the weaker battery described. One terminal of the other coil is connected to the same pole of the same battery, and the other terminal to earth. Consequently, a current flows continually through one of the coils, giving the armature a constant tendency toward one side. When the test plug is applied to an idle grounded line, the two coils are in parallel between the two poles of the battery; their direction of winding is such that they tend to neutralize each other, and their resistances are so adjusted that the coil which is continually active, still predominates. But when the plug is applied to the test ring of a line which is in use, the test battery connected thereto sends current through both coils in series, reverses the polarity of the constantly energized magnet, and strengthens that of the other, and thus throws the armature into contact with the other pole. This motion of the armature may constitute a visual signal, or the armature may be arranged to strike a bell and its movement will give an audible signal.

My invention will be more readily understood by reference to the accompanying drawing, which is illustrative thereof.

In the drawing I have shown a multiple switch board system, to which three sub stations are connected by lines, equipped with my improved testing system. Of these sub stations, I have shown two connected with the exchange by metallic circuits and one by a grounded line. Thus, the circuit from station 1, at the left of the drawing, may be traced over line $a$, to the frame of a springjack $a'$ at the first board at the left of the drawing, to the frame of springjack $a^2$ at the second board, to the frame of the answering jack $a^3$ at the second board, through the annunciator $a^4$ at the same board, thence to the line spring of answering jack $a^3$, thence through the contact and line spring of line jack $a^2$, similarly through jack $a'$, thence returning by line $a^5$ to station 1. Lines $b$, $b^5$, from station 2 will be found likewise connected to its springjacks $b'$, $b^2$, $b^3$, and annunciator $b^4$. Circuit from station 3 may likewise be traced by line $c$ to its line jacks returning through line $c^5$ and earth.

In order to avoid confusion of the drawing, the branch wires $c^6$ $c^7$ from lines $c$ $c^5$ are not shown connected to an individual annunciator; this may however be supposed to be located upon the first board.

The operator's keyboard outfit is of the ordinary type. That at the second switchboard, at the right of the drawing, is shown complete. It comprises two connecting plugs, $d$, $d'$, each having two contact pieces, of which one is adapted to make contact with the frame and the other with the line spring of the springjack into which it is thrust. Similar contacts are electrically connected, the tips through a condenser $e$, the sleeves directly. Two calling keys, $f$, $g$, are included in circuit between the plugs, one on each side of condenser $e$; by depressing these keys, the operator is enabled to disconnect both contact pieces of either plug from those of the other, and to connect them to the two poles of a calling magneto, and thus to send a call to either of two subscribers connected by means of the cords. Branch connections are extended from the conductors joining like contact pieces of the plugs, to the contact anvils of a listening key $h$, having two springs adapted to come into contact with the contact pieces, connected to the terminals of the operator's telephone set $i$, whereby the operator upon depressing the plunger of key $h$, may connect her telephone $i$ in a branch circuit between the two conductors joining the plugs, and hence between the two sides of a circuit joining two subscribers in communication. Another branch connection from the conductor joining the sleeves of the plugs, extends through a retardation coil $m$, and a test battery $l$ to earth; and a branch from that conductor which joins the tips of the plugs extends through the responsive device described, to earth. This testing system is not shown complete at this board, to avoid needless complication of the circuits; its position with relation to the rest of the keyboard circuit is merely indicated at $x$ but at the first board the testing system is shown complete, and divested as far as possible of apparatus not concerned in its operation. Here I have shown the two connecting plugs $d^2$, $d^3$, having their tips connected through the condenser $e'$, and their sleeves connected directly. To that conductor $k'$ which joins the sleeves of the two plugs, is connected the usual test battery, $l'$, and a retardation coil $m'$ between the battery and the conductors, in order that several pairs of coils may be connected to the same test battery, without crossing them together.

At $n$ is shown the polarized responsive device described. Two magnets $o$, $p$, are polarized by the permanent magnet $q$; they are adapted to act with equal force upon opposite ends of the pivoted armature $r$; the coil of magnet $o$ is connected at one end, through a retardation coil $s$ to earth; the other end is connected through a retardation coil $t$ to a battery $u$, whose other pole is grounded. One end of coil $p$ is connected to the same pole of battery $u$ and its other end by a branch connection to the testing plug $d^3$. The direction of winding of the two coils is such that a current from battery $u$ shall polarize both magnets in the same direction.

The armature $r$ carries a hammer $v$ adapted to strike a bell $w$ when it is thrown from its normal position.

In the drawing I have shown two sub stations, 1 and 2, connected for conversation.

I will now proceed to describe the operation of the switching system shown, and trace especially the operation of my improved testing sytem; the mode of operation of the switching apparatus is so well known as to need but little description. Suppose that subscriber at sub station 1 desires to communicate with subscriber at sub station 2; by means of his calling generator, he causes the shutter of the annunciator $a^4$ to fall; the operator at the second board being thus notified that a connection is desired, inserts answering plug $d$ into answering jack $a^3$, and throws the cam of her listening key $h$ into its vertical position, whereby she is placed in communication with subscriber at station 1. Having learned that a connection with station 2 is desired, she proceeds to test that line, to determine whether it is already is use or not, by applying the tip of her testing plug $d'$ to the test ring of jack $b'$ at her board. If the line be in use, she will receive a response of her testing apparatus; but as the operation of the latter is more readily described in connection with the switchboard at the left of the drawing I will pass by it now, to revert to it later. Suppose, merely, that she finds the line not in use. She inserts the plug $d'$ in the springjack $b'$ and depresses calling key $g$, whereby a call signal is sent to station 2. The subscriber at that station having removed his telephone from its switch hook, the two subscribers are in communication; and the operator now disconnects her telephone.

I will now describe the testing system in detail. Normally the battery $u$ sends a current through the coil $o$ of the responsive device $n$, maintaining the armature in the position shown. If now a test of an idle metallic circuit be made, the conditions are not changed, because no path exists from the coil $p$ to earth, but if an idle grounded line be tested, two paths exist from the test ring of the line tested, through the annunciator to earth, and through the subscriber's apparatus to earth. But to prevent the current which will under this condition flow through the coil $p$ to earth, from actuating the armature $r$, it is necessary to have made the resistance of the path through coil $o$ very slightly lower than through coil $p$; then the armature will still remain uninfluenced. When, however, a busy line, either metallic or grounded, is tested a test signal will be given thus: When connection is made to a line by means of a connecting plug as $d'$, the test battery $l$ connected to the sleeve thereof sets up a difference of potential between the test rings of all the springjacks of that line, and the earth. If now a test plug, as $d^3$ be applied to a test ring of that line, as $b^2$ of the drawing, current will flow from battery $l$ to the test ring to which the connection is made, thence to the test ring tested, as $b^2$, thence through tip of test plug $b^3$, through coil $p$ of responsive device $n$, energizing that coil powerfully; thence a part flows to earth through battery $u$, and another and greater part through retardation coil $s$ to earth, de-energizing the magnet $o;$ hence the armature $r$ is thrown strongly to the other side and gives the test signal. The battery $u$ should be arranged so as to assist battery $l$ in sending current through this circuit; that is, its polarity should be in the same direction as that of $l$. The battery $u$ is in practice made of such strength that when an idle line is tested any static discharge or induced currents which may be present upon it shall not send a current through the responsive device in opposition to the battery; hence the strength of the battery $u$ must be varied to suit the varying conditions.

I do not confine myself to any particular character of test signal nor means for making the same; I have sometimes employed a polarized instrument mounted upon or near the operator's transmitter, and adapted to strike the transmitter when actuated. This device I have described and claimed in an application (Case No. 263) filed of even date herewith.

Having thus fully described my invention, I claim as new and desire to secure by Letters Patent—

1. In a test circuit, the combination with a series of test rings electrically connected together, of a polarized responsive device having two coils adapted to act upon a pivoted armature, a branch extending through both coils in series to earth, a branch extending through both of the coils in parallel and including a battery, substantially as and for the purpose specified.

2. In combination, a series of test rings electrically connected together, a branch connection extending from one of the test rings to earth and including a source of electricity, a branch connection from another test ring to earth, through both coils of a polarized responsive device, having two magnets adapted to act in opposition to each other upon an armature and a branch connection from a point between the two coils of the responsive device to earth through a battery, substantially as and for the purpose described.

3. As an element in a test circuit, two permanently polarized magnet cores adapted to act upon a pivoted armature in opposite directions, in combination with helices having two of their ends connected together, upon the cores, a connection to earth from the free end of one of the helices, a conductor terminating in a test plug connected to the free end of the other helix, and a grounded battery connected to the connected ends of the two helices, substantially for the purpose and in the manner described.

4. In a test system, the combination with a series of electrically connected test rings, of a branch through the sleeve of a connecting plug and a test battery $l$ to earth, a second branch connection extending from the test plug $d^3$ through coils $p$ and $o$ of a polarized responsive device $n$ to earth, and a grounded battery $u$ connected to the conductor joining the two coils $o$ and $p$ substantially as and for the purpose specified.

5. In a test system for multiple switchboards, a source of electricity adapted for connection through a retardation coil to any line of a switchboard, another source of electricity adapted for connection with any line of the system through a testing device, the current which flows through the testing device being conducted differentially through said device when connection is made with a line, whereby a test may be made and the device caused to respond to currents from the first mentioned source of electricity.

In witness whereof I hereunto subscribe my name this 10th day of June, A. D. 1891.

CHARLES E. SCRIBNER.

Witnesses:
FRANK R. MCBERTY,
GEORGE L. CRAGG.